United States Patent [19]

Hamlin et al.

[11] 4,286,973
[45] Sep. 1, 1981

[54] WET GAS SCRUBBING OF PARTICULATES

[75] Inventors: Robert N. Hamlin; William W. Dickinson, both of Duncan, Okla.

[73] Assignee: Sun Oil Company of Pennsylvania, Philadelphia, Pa.

[21] Appl. No.: 123,591

[22] Filed: Feb. 22, 1980

[51] Int. Cl.³ .............................................. B01D 47/00
[52] U.S. Cl. ......................................... 55/92; 55/237; 55/242; 55/349; 261/79 A; 261/116
[58] Field of Search ....................................... 55/92–94, 55/228, 227, 235–238, 242, 349, 85, 223; 261/79 A, 115–118, 22

[56] References Cited

U.S. PATENT DOCUMENTS

| | | | |
|---|---|---|---|
| 1,875,755 | 9/1932 | Noyes | 55/242 |
| 2,604,185 | 7/1952 | Johnstone et al. | 55/237 |
| 2,840,454 | 6/1958 | Tomlinson | 261/117 |
| 3,212,235 | 10/1965 | Markant | 261/118 |
| 3,388,897 | 6/1968 | Calaceto | 261/118 |
| 3,488,924 | 1/1970 | Reeve | 55/92 |
| 3,546,851 | 12/1970 | Hardison et al. | 55/238 |
| 3,763,634 | 10/1973 | Alliger | 261/118 |
| 3,912,469 | 10/1975 | Ewan et al. | 261/79 A |
| 3,989,465 | 11/1976 | Onnen | 55/238 |
| 3,989,488 | 11/1976 | Wisting | 261/79 A |

FOREIGN PATENT DOCUMENTS 482594  4/1938  United Kingdom ................. 55/238

*Primary Examiner*—Bernard Nozick
*Attorney, Agent, or Firm*—J. Edward Hess; Donald R. Johnson; Paul Lipsitz

[57] ABSTRACT

A method for removing particulates from flue gases by water scrubbing wherein the gases are contacted with a multiplicity of water sprays in a duct leading to cyclone separators and the gases are further sprayed with water within the cyclones, the cyclones separating the gases from the particulate material which is flushed from the cyclone by spraying water on the inner surface of the cyclone.

1 Claim, 4 Drawing Figures

WET GAS SCRUBBING OF PARTICULATES

It is known in the art to remove particulate material from gaseous streams by scrubbing with water. The water spray cools the gases and agglomerates the fine particulates to larger particles which then can be separated from the gaseous stream, often with a cyclone separator. Frequently, complex equipment is used to enhance efficiency for the particulate separation. For example, U.S. Pat. No. 3,388,897 describes a system where a particulate laden gas is passed into a frustroconical housing where it is subjected to water sprays and then is passed into a cyclonic scrubber where the gas is subjected to watersprays from a plurality of radially extending jet nozzles spaced circumferentially and vertically along the wall of the scrubber, the scrubbed gas then being removed from an exit at the top of the cyclone and the separated liquid containing the particulate being removed from the bottom.

The present invention provides a method for particulate removal from gases, particularly flue gases and similar gaseous streams with simple, essentially standard equipment or equipment easily modified from available standards. In accord with the invention particulates are removed from gaseous streams by contacting the gas with a multiplicity of water sprays in a duct conveying the gas to one or more cyclone separators, contacting the stream further with water sprays within the cyclone(s), the sprays being positioned to contact the entire cross-sectional area of the gas stream as it enters the cyclone(s) and also maintaining a water spray on the inner surface of the cyclone(s) to wash down separated particulate material. Where the gas stream contains $CO_2$ and $SO_2$ the process is also effective in absorbing these gases.

In order to further illustrate the invention reference is now made to the drawings.

Figures 1, 2:
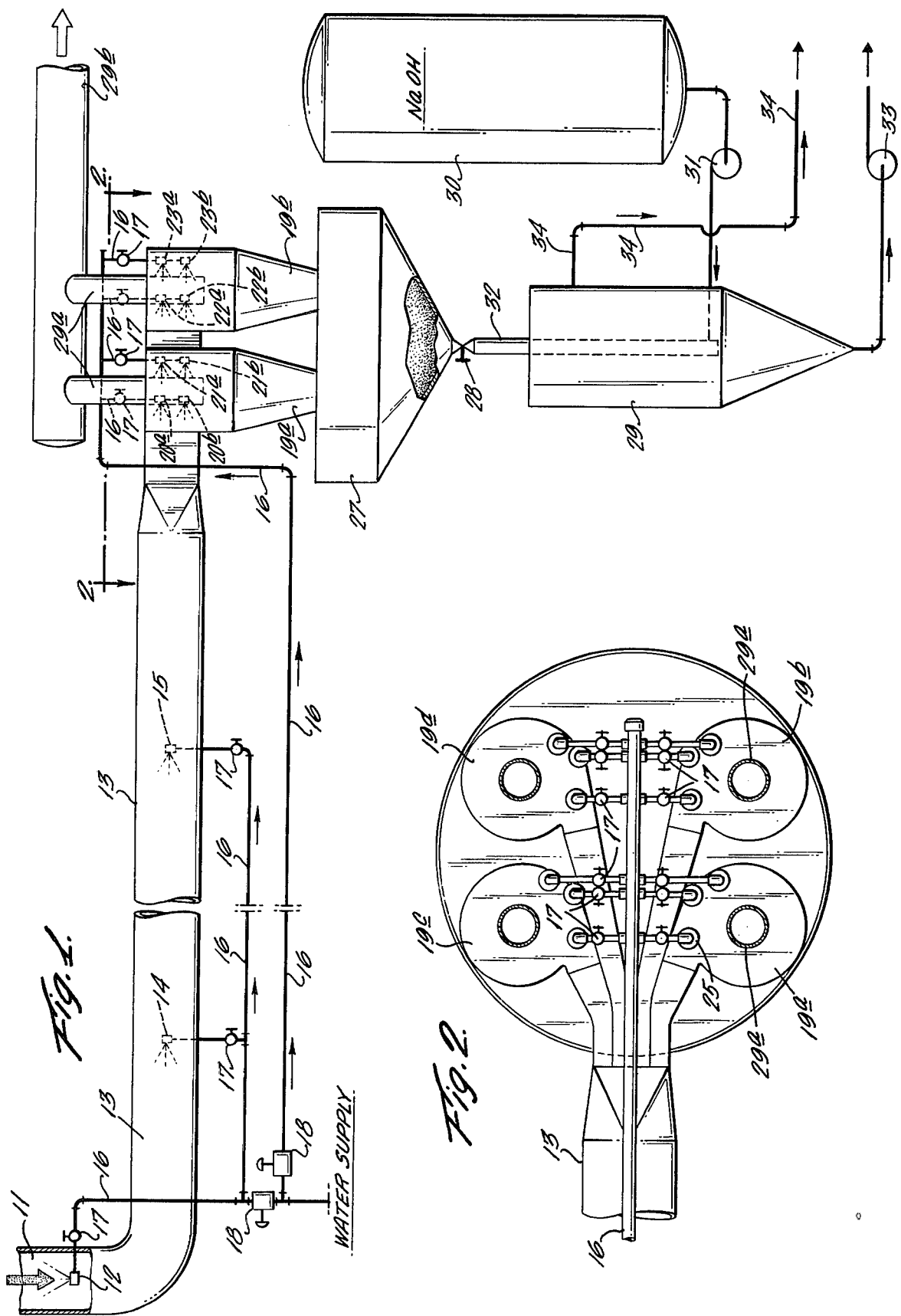
FIG. 1 is a side view of an overall schematic of the process.
FIG. 2 is a plan view taken along lines 2—2 of FIG. 1 of the gas feed stream to a bank of four cyclone separators.
Figure 4:
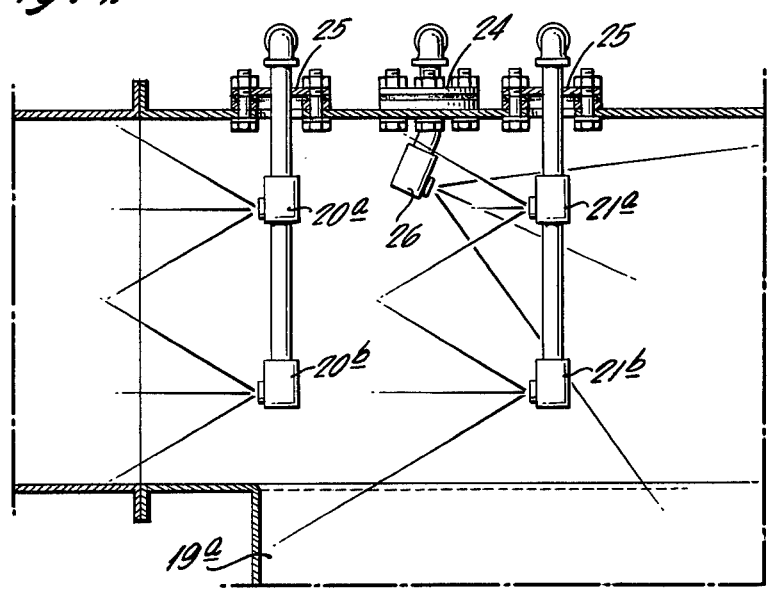
FIG. 4 is a side elevation view of the nozzles in the cyclone taken along lines 4—4 of FIG. 3.

Referring now to FIG. 1, the particulate laden gas flowing through input duct 11 is sprayed with water by spray nozzles 12 and then enters duct 13 where additional nozzles 14 and 15 spray additional amounts of water into the moving gas stream. As shown in the drawing it is preferred that the water spray be directed into the gaseous stream. The water supply system is shown by lines 16, and valves 17 control the flow in conjunction with pressure regulators 18. The water washed gas stream then enters one or more cyclones (preferably a bank of two or more) two of which are shown in FIG. 1 as 19a and 19b and in FIG. 2 where a bank of four cyclones is shown as 19a, 19b, 19c, and 19d. Within each cyclone are additional water spray nozzles, preferably arranged in pairs, one above the other, shown as 20a and 20b, 21a and 21b, 22a and 22b, and 23a and 23b in FIGS. 1 and 4. Again, the spray is preferably directed toward the gas stream as it enters the cyclones. Not shown in FIG. 1, but evident in FIG. 4 which depicts a section of one cyclone, is flushing nozzle 26 which is present in each of the cyclones used. This nozzle is preferably positioned at an angle to direct water downwardly against the inside wall of the cyclone and thereby prevent any particulate material from sticking to the wall and building up within the cyclone. The flushing nozzle 26 is directed away from the incoming gas stream as shown. By use of a plurality of vertically disposed nozzles (20a and 20b, and 21a and 21b in FIG. 4) the entire area of the gas stream entering the cyclone is sprayed with water and the particulate matter which is separated out is washed down into the cyclone hopper 27 (FIG. 1). The clean gaseous stream passes from the cyclone through ducts 29a and is removed from the system at the exit of duct 29b as shown in FIG. 1.

Figure 3:
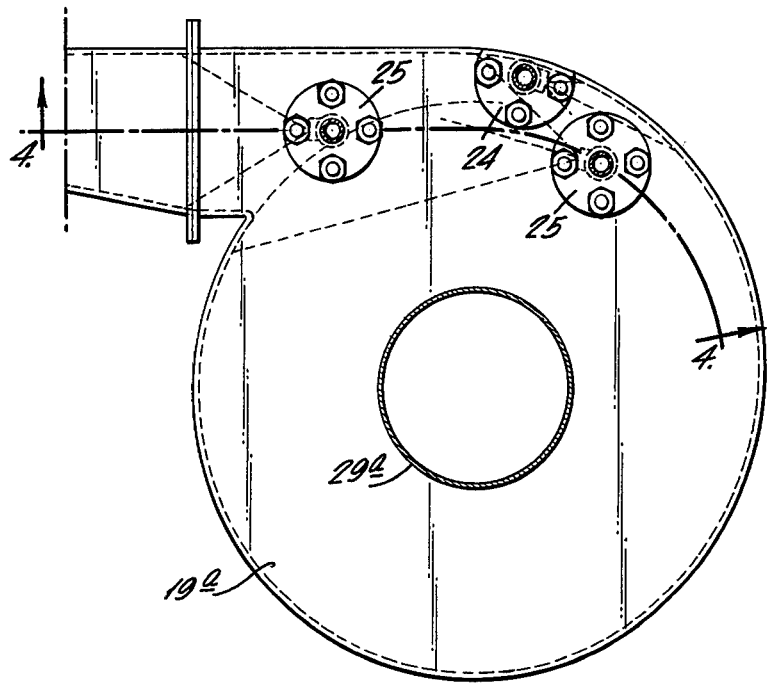
FIG. 3 is a plan view of spray nozzles in a cyclone separator.

FIGS. 2 and 3 show in plan view the fittings for supporting the nozzles and valves for feeding water into the nozzles within the cyclones. Fittings shown generally as 24 are for the water lines leading to the flushing nozzles. The spray nozzles shown in FIGS. 2 and 3 are supported from the top of the cyclones by fittings shown generally as 25.

Referring again to FIG. 1, the aqueous suspension of particulate material in hopper 27 is fed through valve 28 and downcomer 32 to the lower portion of a neutralization and seal tank 29 where a sodium hydroxide solution of about 3° Be from storage tank 30 is fed by means of pump 31 into the bottom portion of the downcomer 32. The acidic water due to absorption of $CO_2$ and $SO_2$ present in the flue gases is thus neutralized and the aqueous particulate suspension is taken out of tank 29 by means of pump 33 for subsequent disposal. Line 34 establishes a seal on the system and handles overflow water from tank 29.

The water scrubbing system of the invention results in a very high recovery of particulates, being on the order of 90%. Furthermore, it has advantages in economy of construction and use, particularly in that the neutralization of the acidic water and particulates does not require high amounts of alkali which would be needed if neutralization were to be carried out in or before the cyclones when the $CO_2$ and $SO_2$ are present.

In a specific example of a particulates recovery system operating in accord with the invention, 76 to 88% of the catalyst particulates from a fluidized cracking system fed into the input duct at a rate of 250 lb/hr. are recovered in the water effluent so that the particulate emissions from the stack range from 27 to 51 lbs/hr which is below environmental allowances. This water scrubbing operation also removes about 39% of the $SO_2$ in the input gases.

The invention claimed is:

1. A method for removing particulates and acidic gases from flue gases comprising the steps of
    (a) contacting said gases passing through a duct leading to a bank of two or more cyclone separators with a multiplicity of water sprays in said duct directed toward the incoming gas stream,
    (b) contacting the gases as they enter said cyclones with a plurality of water sprays directed toward the incoming gas stream and in vertical aligment located inside said cyclones and having a spray configuration which ensures that essentially the entire cross-sectional area of the gases entering said cyclones are contacted,
    (c) spraying water on the inside wall of said cyclones to flush particulates to the cyclone bottom for separation from said cyclones as a suspension of particulates in water, said flushing water being directed away from the incoming gas stream,
    (d) removing off-gases from said cyclone, and
    (e) neutralizing the aqueous suspension of particulates separated from said cyclone.

* * * * *